Figure 1:
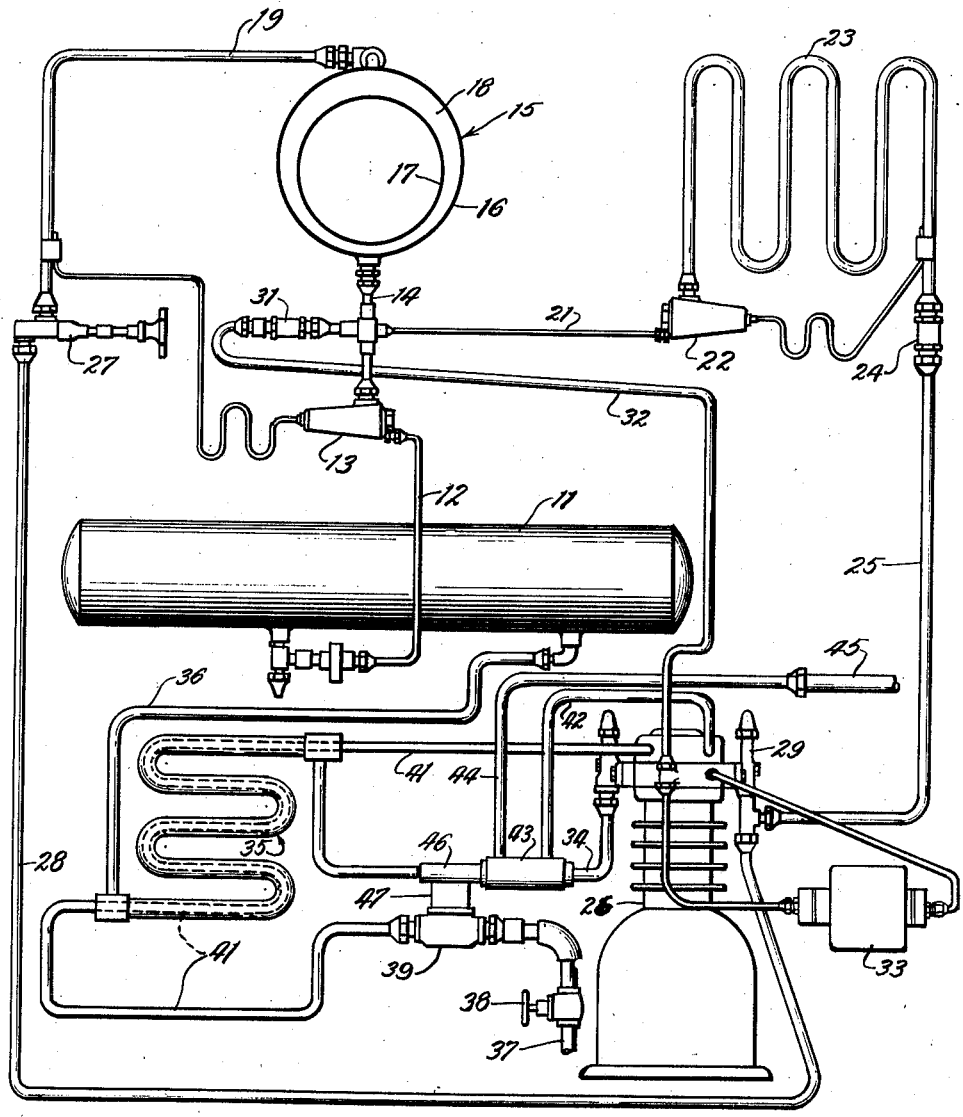

Jan. 3, 1939.  R. F. POLLEY  2,142,734
THERMOSTATIC WATER REGULATOR FOR WATER COOLED REFRIGERATING SYSTEMS
Filed Sept. 24, 1936  2 Sheets-Sheet 1

Inventor:
Ray. F. Polley,
By:-
Atty.

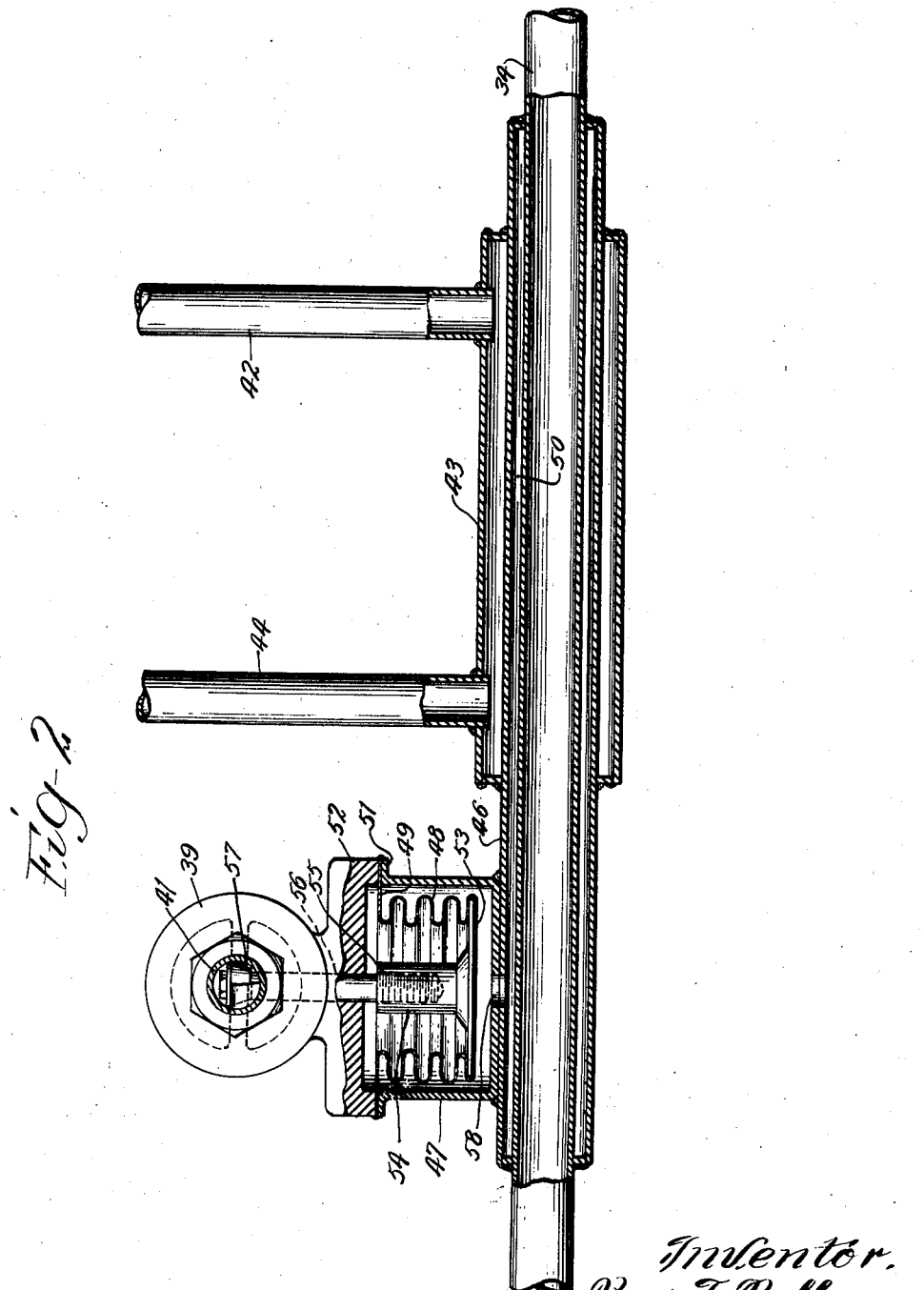

Patented Jan. 3, 1939

2,142,734

UNITED STATES PATENT OFFICE 2,142,734

THERMOSTATIC WATER REGULATOR FOR WATER-COOLED REFRIGERATING SYSTEMS

Ray F. Polley, Chicago, Ill., assignor to Mills Novelty Company, Chicago, Ill., a corporation of Illinois Application September 24, 1936, Serial No. 102,362

7 Claims. (Cl. 62—115)

This invention relates to refrigerating apparatus of the water-cooled type and more particularly to a thermostatic control device for regulating the flow of water through the system.

An important object of the invention is to provide a device of this character which will cause just the right amount of flow of water through the system to maintain the desired temperature therein, provision being made for starting the flow quickly after operation of the compressor usually employed in such systems is started and for cutting off the flow promptly after the compressor stops, the control means being unaffected by any false pressures which might exist in the system and being responsive to definite factors determining the need for cooling water in the system.

Referring to the drawings:

Fig. 1 is a schematic view of a typical water-cooled refrigerating system showing the thermostatic water regulator of my invention; and Fig. 2 is a view, partly in plan and partly in section, of the thermostatic regulator.

Referring first to Fig. 1, the numeral 11 indicates a receiver tank for the fluid refrigerant, said tank being communicably connected by means of a pipe 12, expansion valve 13, and pipe 14, with appropriate fittings, with a freezer generally indicated by the reference numeral 15. Said freezer consists of an outer cylinder 16 and inner cylinder 17 which, as shown, are arranged in eccentric relationship, the space 18 between said cylinders forming a chamber for the liquid refrigerant, which expands therein with absorption of heat to cause the material in the cylinder 17 to be frozen in the usual manner, and is taken off in gaseous form through a pipe 19.

A portion of the refrigerant is directed from the pipe 14 through a pipe 21 and an expansion valve 22 to a hardening cabinet refrigerating coil 23, and thence through a check valve 24 and pipe 25 to the usual compressor 26.

The gas from the pipe 19 passes through a valve 27 and pipe 28 to the compressor, the pipes 28 and 25 both leading into a fitting 29 communicating with the compressor head. A pressure relief check valve 31 is provided adjacent and in communication with the pipe 14 and a pipe 32 leads therefrom to the compressor which is equipped with a low pressure control device of usual form generally indicated at 33.

The hot gases from the compressor pass through a pipe 34, a portion of which is enlarged and arranged in coil form to form a part of a counter flow condensor indicated generally at 35, in which they are restored to liquid form, the resulting liquid refrigerant being directed through a pipe 36 back to the receiver tank 11.

The water inlet is through a pipe 37 in which there is a manually operable valve 38 and an automatically operable valve 39 from which a pipe 41 leads through the counter flow condenser 35 to the compressor. After passing through the compressor, the water flows through a pipe 42 which leads to a water-jacket 43 from which pipe 44 leads to an outlet pipe 45. The water-jacket 43 surrounds a cylinder 46 on the pipe 34, which cylinder, in conjunction with the pipe, forms a chamber 50, said chamber communicating with a housing 47 containing a thermostatically-controlled valve operating element which in the present instance is in the form of a bellows 48 as shown in Fig. 2.

Referring now to Fig. 2, it will be noted that the bellows 48 is formed with a flange 49 clamped between a flange 51 on the housing 47 and the cover plate 52 secured thereto in airtight relationship by any suitable means (not shown). A head portion 53 of said bellows is provided with a socket 54 in which is secured by screw threads 55 a valve stem 56 extending into the housing of the valve 39 and carrying a movable valve element 57 for controlling the flow of water in the pipe 41. The chamber 50 contains a volatile pressure medium such as methyl chloride, ether, or ethyl chloride, which passes freely through an aperture 58 in the wall of the housing 47 and the jacket 46. The temperature and consequent pressure of said medium is affected by the temperature of the gases passing through the pipe 34 and when said temperature and pressure increase to a certain point, the bellows 48 is contracted, lifting the movable element of the valve 39 from its seat and permitting flow of water in the pipe 41. Thus, whenever the temperature gets to the point that there is need for cooling water in the system, the valve is opened, and it will be noted that by reason of the rapid rise in temperature when hot gases start to flow through the pipe 34 upon the starting of the compressor, the valve will be quickly opened to start the flow of water through the cycle indicated in the description of the apparatus shown in Fig. 1.

The flow of water through the water-jacket 43 produces a modulating effect upon the pressure medium, the temperature of the latter, when water is flowing through the system, thus being a mean temperature produced by the normally opposing effects of the hot gases and the water.

It will be understood that the water is heated to a considerable extent in passing through the counter flow condenser 35 and the compressor 26, being normally raised twelve or fifteen degrees above the temperature of the incoming water. Consequently when the compressor is operating, the water will be sufficiently warm so that it will merely modulate the effect of the hot gases and the thermostatic device will be operated to open the inlet valve whenever the temperature rises to the point that cooling is required. However, the natural temperature fall upon stopping the compressor will be such as to quickly cool the pressure medium in the chamber 50 to the point where it will cause expansion or elongation of the bellows 48, thereby closing the valve and stopping the flow of water. In this manner, unnecessary flow of water after the compressor is shut off is prevented.

The temperature of the gases in the pipe 34 and of the water in the jacket 43 are definite quantities unaffected by any false pressures which may exist in the refrigerating system itself, and the volatile pressure medium which is confined in the chamber 50 and housing 47 responds quickly to the combined effect of the gases and the water. Thus an efficient control system is provided which allows flow of water only when necessary, and which starts the flow quickly after operation of the compressor begins and terminates it promptly after the operation stops.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. In a water-cooled refrigerating apparatus including a compressor, a hot gas line leading from the compressor, a water inlet conduit leading to the compressor, a water outlet conduit leading from the compressor, and a valve in the inlet conduit: a thermostatic control device for automatically operating said valve, comprising a pressure-controlled movable element; means connecting said element to a movable member of the valve; a chamber surrounding said hot gas line and containing a volatile pressure medium; said chamber being in direct heat-transfer relationship with both said hot gas line and said water outlet conduit and a housing for said pressure-controlled element communicating with said chamber, whereby changes in temperature and consequent changes in pressure of said medium will cause actuation of said element to open or close said valve.

2. In a water-cooled refrigerating apparatus including a compressor, a hot gas line leading from the compressor, a water inlet conduit leading to the compressor, a water outlet conduit leading from the compressor, and a valve in the inlet conduit: a thermostatic control device for automatically operating said valve, comprising a pressure-controlled movable element; means connecting said element to a movable member of the valve; a chamber surrounding said hot gas line and containing a volatile pressure medium; a housing for said pressure-controlled element communicating with said chamber, whereby changes in temperature and consequent changes in pressure of said medium will cause actuation of said element to open or close said valve; and a water-jacket in said outlet conduit surrounding said chamber, whereby water flowing through said jacket will have a modulating effect upon said pressure medium, the temperature of the latter thus being that resulting from the effect thereon of the hot gases in said line and of the water in said jacket and the flow of water in the inlet conduit being regulated by the resultant temperature of said medium, the water being caused to flow when said temperature reaches a certain maximum and to be cut off when it reaches a certain minimum.

3. In a water-cooled refrigerating apparatus including a compressor, a hot gas line leading from the compressor, a water inlet conduit leading to the compressor, a water outlet conduit leading from the compressor, and a valve in the inlet conduit: a thermostatic control device for automatically operating said valve, comprising a pressure-controlled movable element; means connecting said element to a movable member of the valve; a chamber surrounding said hot gas line and containing a volatile pressure medium; a housing for said pressure-controlled element communicating with said chamber, whereby changes in temperature and consequent changes in pressure of said medium will cause actuation of said element to open or close said valve; and a water-jacket in said outlet conduit surrounding said chamber whereby water flowing through said jacket will have a modulating effect upon said pressure medium, the temperature of the latter thus being that resulting from the effect thereon of the hot gases in said line and of the water in said jacket, said valve controlling element being actuated in direction to open the valve upon increase in temperature and pressure caused by the hot gases and being actuated in direction to close the valve upon decrease in temperature and pressure, such decrease being caused to occur quickly by cool water flowing through said jacket after operation of the compressor stops.

4. A thermostatic water regulator for water-cooled refrigerating apparatus including a hot gas line, a water circulating system and a valve for controlling the flow of water therein, comprising: a thermostatically-controlled valve operating element; and a chamber communicating with said element and containing a volatile pressure medium subject to variations in pressure upon change of temperature of said medium, said chamber being arranged in proximity to the hot gas line and water outlet conduit of the refrigerating system, whereby changing temperature of the gases in said line or of the water in said conduit will change the pressure of said medium and cause the same to automatically open or close said valve.

5. A thermostatic water regulator for water-cooled refrigerating apparatus including a hot gas line, a water circulating system and a valve for controlling the flow of water therein, comprising: a thermostatically-controlled valve operating element; a chamber communicating with said element and containing a volatile pressure medium subject to ready variations in pressure upon change of temperature, said chamber being arranged in proximity to the hot gas line of the refrigerating system, whereby changing temperature of the gases in said line will change the pressure of said medium and cause the same to automatically open or close said valve; and a water-jacket forming a part of said circulating system and surrounding said chamber, whereby water flowing through said jacket will have a modulating effect upon said pressure medium, the temperature of the latter thus being that resulting from the effect of the hot gases in said line and of the water in said jacket.

6. In a water-cooled refrigerating apparatus having a hot gas line, a water circulating system and a water inlet valve: a valve control device comprising a pressure-controlled valve operating element; a chamber surrounding the hot gas line and containing a volatile pressure medium in sealed communication with said element to operate the same; and a water-jacket surrounding said chamber and forming a part of said water circulating system.

7. In a water-cooled refrigerating apparatus including a compressor, a compressed refrigerant line leading from the compressor, a water inlet conduit leading to the compressor, and a water outlet conduit leading from the compressor; a valve in one of said conduits, a pressure-responsive element adapted to actuate said valve, and a volatile fluid filled chamber, communicating with said element so that the latter is controlled by expansion and contraction of said fluid, said chamber being associated with said water outlet conduit and compressed refrigerant line so that the fluid therein is responsive directly to the temperature of the compressed refrigerant modulated by the discharged water when the latter is flowing.

RAY F. POLLEY.